(12) United States Patent
Yang et al.

(10) Patent No.: US 12,543,223 B2
(45) Date of Patent: Feb. 3, 2026

(54) INDICATION OF INITIAL ACTIVE BANDWIDTH PART

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/309,696

(22) Filed: Apr. 28, 2023

(65) Prior Publication Data

US 2024/0365389 A1   Oct. 31, 2024

(51) Int. Cl.
*H04W 74/0833* (2024.01)
*H04W 72/02* (2009.01)
*H04W 72/0457* (2023.01)

(52) U.S. Cl.
CPC ....... *H04W 74/0833* (2013.01); *H04W 72/02* (2013.01); *H04W 72/0457* (2023.01)

(58) Field of Classification Search
None
See application file for complete search history.

(56) References Cited

U.S. PATENT DOCUMENTS

| 2019/0215870 | A1* | 7/2019 | Babaei | H04W 24/10 |
| 2019/0335507 | A1* | 10/2019 | Agiwal | H04W 48/16 |
| 2024/0365389 | A1* | 10/2024 | Yang | H04W 74/0833 |

FOREIGN PATENT DOCUMENTS

| EP | 3506713 A1 | 7/2019 | |
| WO | WO-2022133357 A1 * | 6/2022 | ........ H04W 74/0833 |
| WO | 2022235962 A1 | 11/2022 | |

OTHER PUBLICATIONS

International Search Report and Written Opinion—PCT/US2024/022464—ISA/EPO—Jul. 26, 2024.

* cited by examiner

*Primary Examiner* — Faiyazkhan Ghafoerkhan
(74) *Attorney, Agent, or Firm* — Harrity & Harrity, LLP

(57) ABSTRACT

Various aspects of the present disclosure generally relate to wireless communication. In some aspects, a user equipment (UE) may receive information that indicates one or more parameters that correspond to one or more initial active bandwidth parts (BWPs), each initial active BWP being smaller than a full available BWP. The UE may select an initial active BWP from the one or more initial active BWPs. The UE may transmit a random access channel message based at least in part on a first parameter, of the one or more parameters, that corresponds to the selected initial active BWP. Numerous other aspects are described.

30 Claims, 12 Drawing Sheets

| Preamble index, RO range | Preferred Initial Active BWP | Preferred UL/DL MIMO Layer | Sparse PDCCH Monitor | Preferred C-DRX Settings | MSG3 /MSGB Repetition |
|---|---|---|---|---|---|
| X1~Xn1 | BWP1 | N1/M1 | P1/P2(1/1) | X1 | 1 |
| Y1~Yn2 | BWP2 | N2/M2 | P1/P2(1/2) | X2 | 2 |
| Z1~Zn3 | BWP3 | N3/M3 | P1/P2(1/4) | X3 | 4 |
| W1~Wn4 | BWP4 | N4/M4 | P1/P2(1/8) | X4 | 8 |

INDICATION OF INITIAL ACTIVE BANDWIDTH PART

FIELD OF THE DISCLOSURE

Aspects of the present disclosure generally relate to wireless communication and to techniques and apparatuses for indicating an initial active bandwidth part.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving information that indicates one or more parameters that correspond to one or more initial active bandwidth parts (BWPs), each initial active BWP being smaller than a full available BWP. The method may include selecting an initial active BWP from the one or more initial active BWPs. The method may include transmitting a random access channel (RACH) message based at least in part on a first parameter, of the one or more parameters, that corresponds to the selected initial active BWP.

Some aspects described herein relate to a method of wireless communication performed by a network entity. The method may include transmitting information that indicates one or more parameters that correspond to one or more initial active BWPs that a UE is to use for communicating, each initial active BWP being smaller than a full available BWP. The method may include receiving a RACH message that is associated with a first parameter, of the one or more parameters, that corresponds to an initial active BWP selected by the UE. The method may include transmitting a message that configures the UE to use the initial active BWP.

Some aspects described herein relate to a UE for wireless communication. The UE may include one or more memories and one or more processors coupled to the one or more memories. The one or more processors may be configured to receive information that indicates one or more parameters that correspond to one or more initial active BWPs, each initial active BWP being smaller than a full available BWP. The one or more processors may be configured to select an initial active BWP from the one or more initial active BWPs. The one or more processors may be configured to transmit a RACH message based at least in part on a first parameter, of the one or more parameters, that corresponds to the selected initial active BWP.

Some aspects described herein relate to a network entity for wireless communication. The network entity may include one or more memories and one or more processors coupled to the one or more memories. The one or more processors may be configured to transmit information that indicates one or more parameters that correspond to one or more initial active BWPs that a UE is to use for communicating, each initial active BWP being smaller than a full available BWP. The one or more processors may be configured to receive a RACH message that is associated with a first parameter, of the one or more parameters, that corresponds to an initial active BWP selected by the UE. The one or more processors may be configured to transmit a message that configures the UE to use the initial active BWP.

Some aspects described herein relate to a non-transitory computer-readable medium that stores a set of instructions for wireless communication by a UE. The set of instructions, when executed by one or more processors of the UE, may cause the UE to receive information that indicates one or more parameters that correspond to one or more initial active BWPs, each initial active BWP being smaller than a full available BWP. The set of instructions, when executed by one or more processors of the UE, may cause the UE to select an initial active BWP from the one or more initial active BWPs. The set of instructions, when executed by one or more processors of the UE, may cause the UE to transmit a RACH message based at least in part on a first parameter, of the one or more parameters, that corresponds to the selected initial active BWP.

Some aspects described herein relate to a non-transitory computer-readable medium that stores a set of instructions for wireless communication by a network entity. The set of instructions, when executed by one or more processors of the network entity, may cause the network entity to transmit information that indicates one or more parameters that correspond to one or more initial active BWPs that a UE is to use for communicating, each initial active BWP being smaller than a full available BWP. The set of instructions, when executed by one or more processors of the network entity, may cause the network entity to receive a RACH message that is associated with a first parameter, of the one or more parameters, that corresponds to an initial active BWP selected by the UE. The set of instructions, when executed by one or more processors of the network entity, may cause the network entity to transmit a message that configures the UE to use the initial active BWP.

Some aspects described herein relate to an apparatus for wireless communication. The apparatus may include means for receiving information that indicates one or more parameters that correspond to one or more initial active BWPs, each initial active BWP being smaller than a full available BWP. The apparatus may include means for selecting an initial active BWP from the one or more initial active BWPs. The apparatus may include means for transmitting a RACH message based at least in part on a first parameter, of the one or more parameters, that corresponds to the selected initial active BWP.

Some aspects described herein relate to an apparatus for wireless communication. The apparatus may include means for transmitting information that indicates one or more parameters that correspond to one or more initial active BWPs that another apparatus is to use for communicating, each initial active BWP being smaller than a full available BWP. The apparatus may include means for receiving a RACH message that is associated with a first parameter, of the one or more parameters, that corresponds to an initial active BWP selected by the other apparatus. The apparatus may include means for transmitting a message that configures the other apparatus to use the initial active BWP.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example of other parameters that can be provided as part of a RACH procedure, in accordance with the present disclosure.

DETAILED DESCRIPTION

Figure 1:
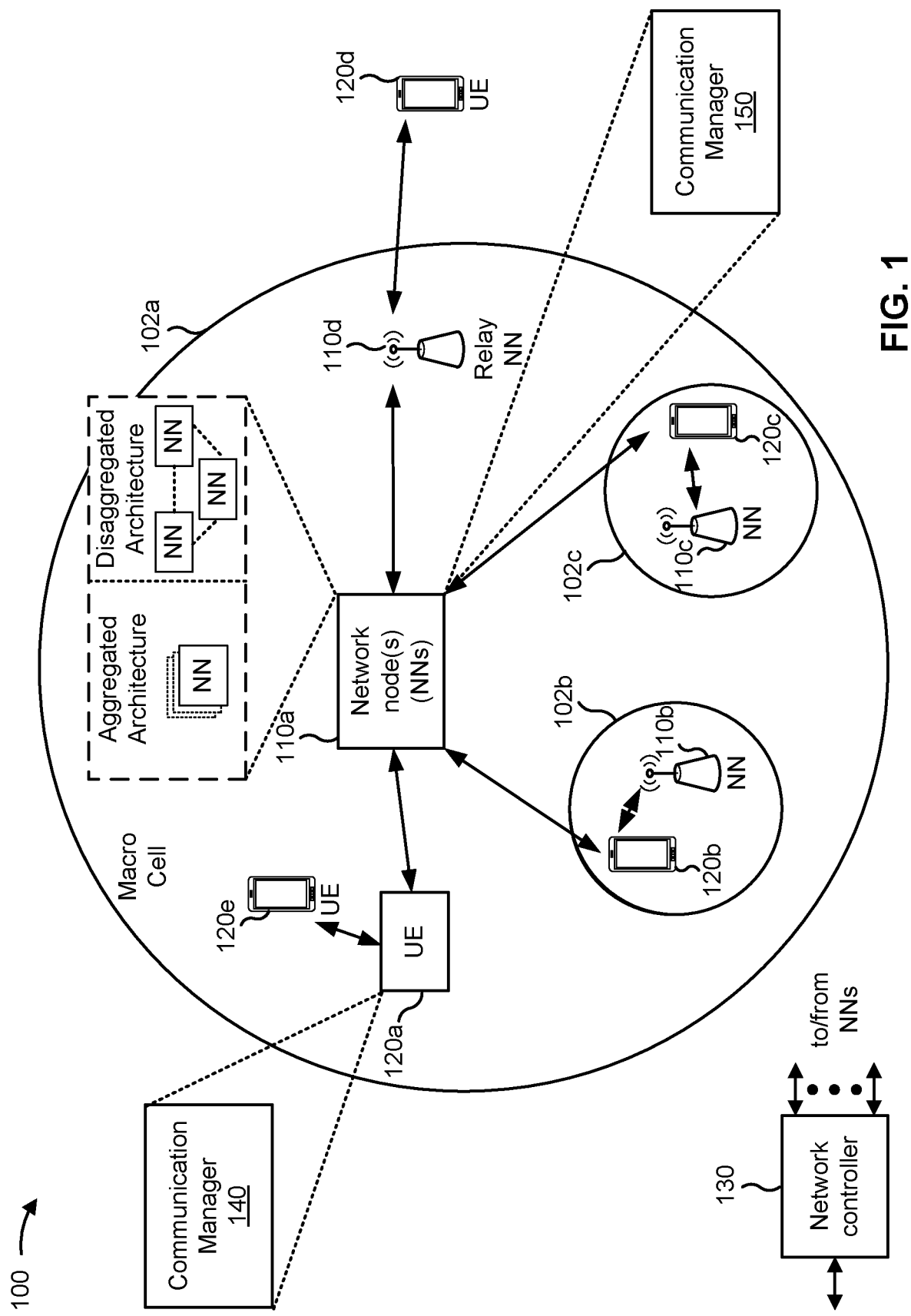
FIG. 1 is a diagram illustrating an example of a wireless network, in accordance with the present disclosure.

A user equipment (UE) may use a bandwidth part (BWP) for communications rather than a full bandwidth in order to conserve energy and signaling resources. The BWP may be a bandwidth that is only part of the full bandwidth available for communications. The UE may switch between multiple BWPs that are all smaller in size (frequency range or bandwidth) than a full available BWP. The full BWP may include all BWPs that can be activated.

During a call setup or a handover, a network may configure a UE with a narrow BWP and a full BWP that can be used for communications. The narrow BWP is smaller in frequency bandwidth than the full BWP. However, the network configures the full BWP, rather than a narrow BWP, as the initial active BWP that is used when the UE is first active. Only after a few seconds does the UE switch from the full BWP to the narrow BWP based on traffic. Using the full BWP as the initial active BWP, with a larger frequency bandwidth than the narrow BWP, consumes power. In some scenarios, the UE may provide or receive assistance information (e.g., UE assistance information (UAI)) associated with BWP usage, but that assistance information is usually provided too late to use to conserve power.

According to various aspects described herein, a network entity may provide an early identification of one or more initial active BWPs that the UE may use first upon activation. Each initial active BWP may be less than a full BWP. For example, the network entity may provide information about the initial active BWP in a random access channel (RACH) msg1, a RACH msg3 or a physical uplink shared channel (PUSCH) part of a RACH msgA. In some aspects, the network entity may transmit information that indicates parameters that correspond to the one or more initial active BWPs. The UE may select an initial active BWP and transmit a RACH message associated with a first parameter indicated in the information that corresponds to the selected initial active BWP. The network entity may transmit a message that configures the UE to use the selected initial active BWP. The UE may communicate in the initial active BWP with less than bandwidth than the full BWP).

By using an early indication of an initial active BWP during a RACH procedure, the UE may use an initial active BWP that is smaller than a full available BWP. As a result, the UE conserves energy that would otherwise be consumed by using a larger frequency bandwidth. In some aspects, the first parameter may be a preamble index or a RACH occasion (RO), which may conserve signaling resources by using existing signaling techniques.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may receive information that indicates one or more parameters that correspond to one or more initial active BWPs, each initial active BWP being smaller than a full available BWP. The communication manager 140 may select an initial active BWP from the one or more initial active BWPs. The communication manager 140 may transmit a RACH message based at least in part on a first parameter, of the one or more parameters, that corresponds to the selected initial active BWP. Additionally, or alternatively, the communication manager 140 may perform one or more other operations described herein.

In some aspects, a network entity (e.g., a network node 110) may include a communication manager 150. As described in more detail elsewhere herein, the communication manager 150 may transmit information that indicates one or more parameters that correspond to one or more initial active BWPs that a UE is to use for communicating, each initial active BWP being smaller than a full available BWP. The communication manager 150 may receive a RACH message that is associated with a first parameter, of the one or more parameters, that corresponds to an initial active BWP selected by the UE. The communication manager 150 may transmit a message that configures the UE to use the initial active BWP. Additionally, or alternatively, the communication manager 150 may perform one or more other operations described herein.

As indicated above, FIG. 1 is provided as an example. Other examples may differ from what is described with regard to FIG. 1.

Figure 2:
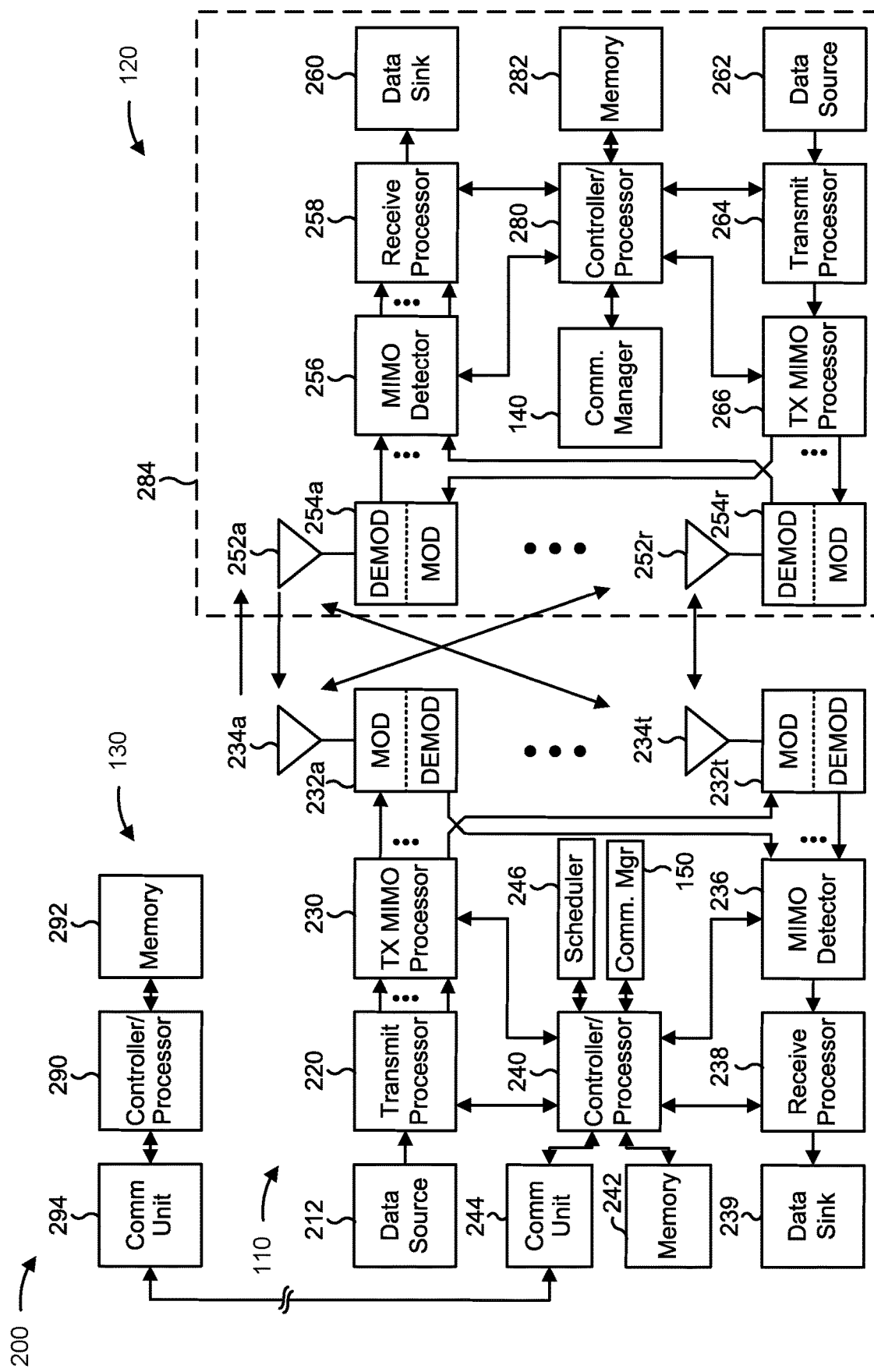
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the network node 110, the controller/processor 280 of the UE 120, and/or any other component(s) of FIG. 2 may perform one or more techniques associated with indicating an initial active BWP, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving information that indicates one or more parameters that correspond to one or more initial active BWPs, each initial active BWP being smaller than a full available BWP; means for selecting an initial active BWP from the one or more initial active BWPs; and/or means for transmitting a RACH message based at least in part on a first parameter, of the one or more parameters, that corresponds to the selected initial active BWP. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., network node 110) includes means for transmitting information that indicates one or more parameters that correspond to one or more initial active BWPs that a UE is to use for communicating, each initial active BWP being smaller than a full available BWP; means for receiving a RACH message that is associated with a first parameter, of the one or more parameters, that corresponds to an initial active BWP selected by the UE; and/or means for transmitting a message that configures the UE to use the initial active BWP. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
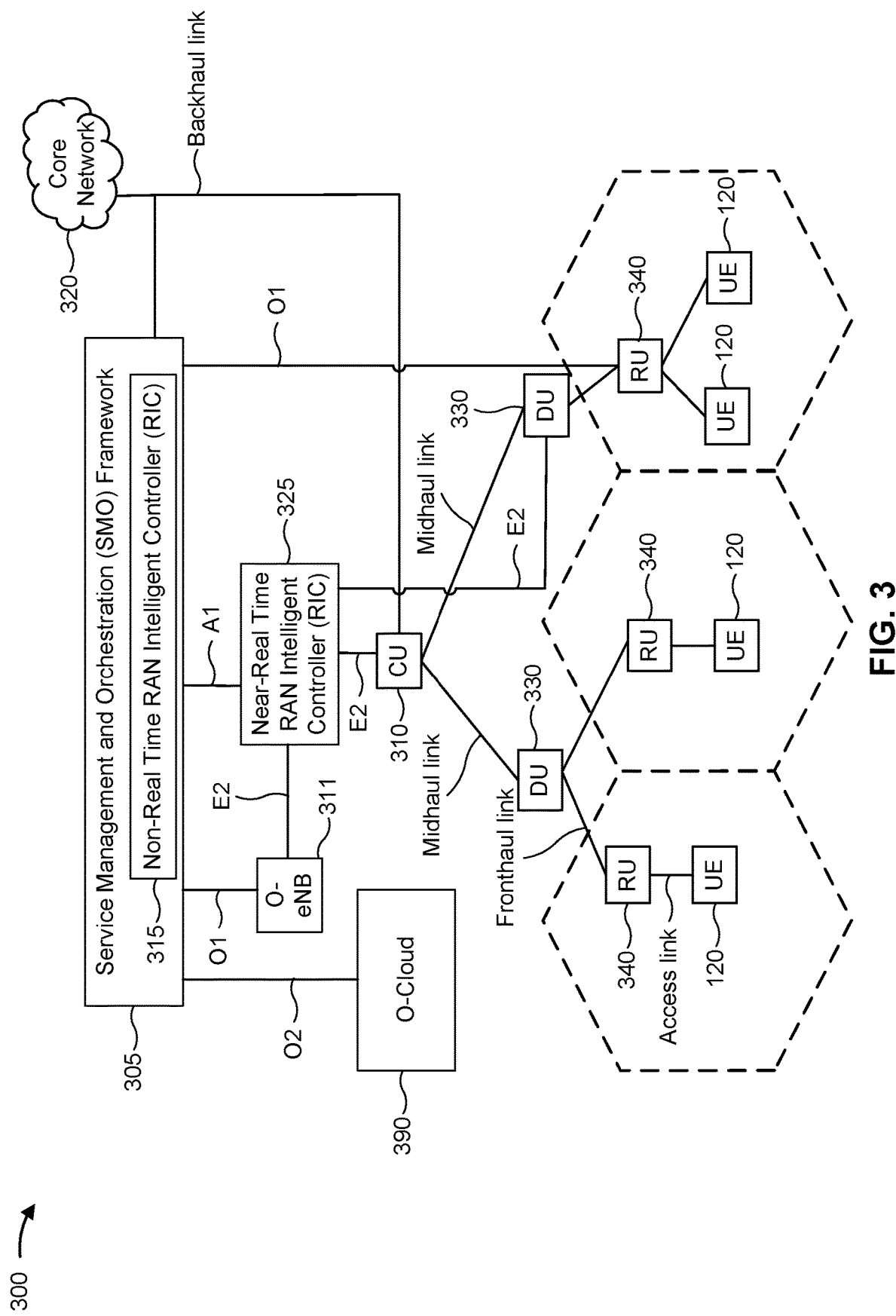
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
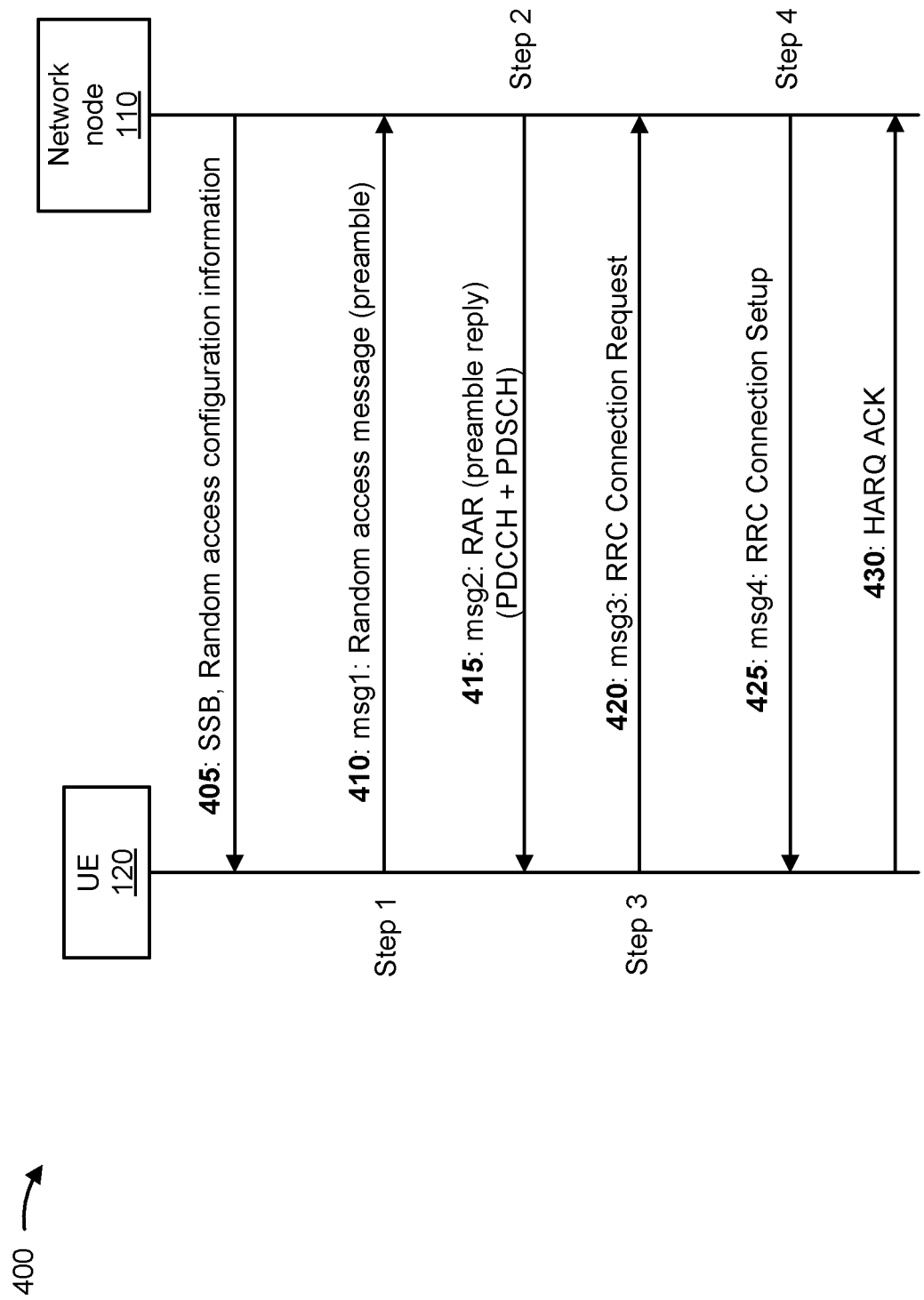
FIG. 4 is a diagram illustrating an example of a four-step random access channel (RACH) procedure, in accordance with the present disclosure.

FIG. 4 is a diagram illustrating an example 400 of a four-step RACH procedure, in accordance with the present disclosure. As shown in FIG. 4, a network entity (e.g., network node 110) and a UE 120 may communicate with one another to perform the four-step RACH procedure.

As shown by reference number 405, the network node 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access (CBRA). Additionally, or alternatively, the random access configuration information may be transmitted in a radio resource control (RRC) message and/or a physical downlink control channel (PDCCH) order message that triggers a RACH procedure, such as for contention-free random access (CFRA). The random access configuration information may include one or more parameters to be used in the RACH procedure, such as one or more parameters for transmitting a random access message (RAM) and/or one or more parameters for receiving a random access response (RAR).

As shown by reference number 410, the UE 120 may transmit a RAM, which may include a preamble (sometimes referred to as a random access preamble, a physical RACH (PRACH) preamble, or a RAM preamble). The message that includes the preamble may be referred to as a message 1, msg1, MSG1, a first message, or an initial message in a four-step random access procedure. The random access message may include a random access preamble identifier.

As shown by reference number 415, the network node 110 may transmit an RAR as a reply to the preamble. The message that includes the RAR may be referred to as message 2, msg2, MSG2, or a second message in a four-step RACH procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step RACH procedure, the network node 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step RACH procedure, the network node 110 may transmit the PDSCH communication for the RAR, as scheduled by the PDCCH communication. The RAR may be included in a medium access control (MAC) protocol data unit (PDU) of the PDSCH communication.

As shown by reference number 420, the UE 120 may transmit an RRC connection request message. The RRC connection request message may be referred to as message 3, msg3, MSG3, or a third message of a four-step RACH procedure. In some aspects, the RRC connection request may include a UE identifier, uplink control information (UCI), and/or a PUSCH communication (e.g., an RRC connection request).

As shown by reference number 425, the network node 110 may transmit an RRC connection setup message. The RRC connection setup message may be referred to as message 4, msg4, MSG4, or a fourth message of a four-step RACH procedure. In some aspects, the RRC connection setup message may include the detected UE identifier, a timing advance value, and/or contention resolution information. As shown by reference number 430, if the UE 120 successfully receives the RRC connection setup message, the UE 120 may transmit a hybrid automatic repeat request (HARQ) acknowledgement (ACK).

As indicated above, FIG. 4 is provided as an example. Other examples may differ from what is described with regard to FIG. 4.

Figure 5:
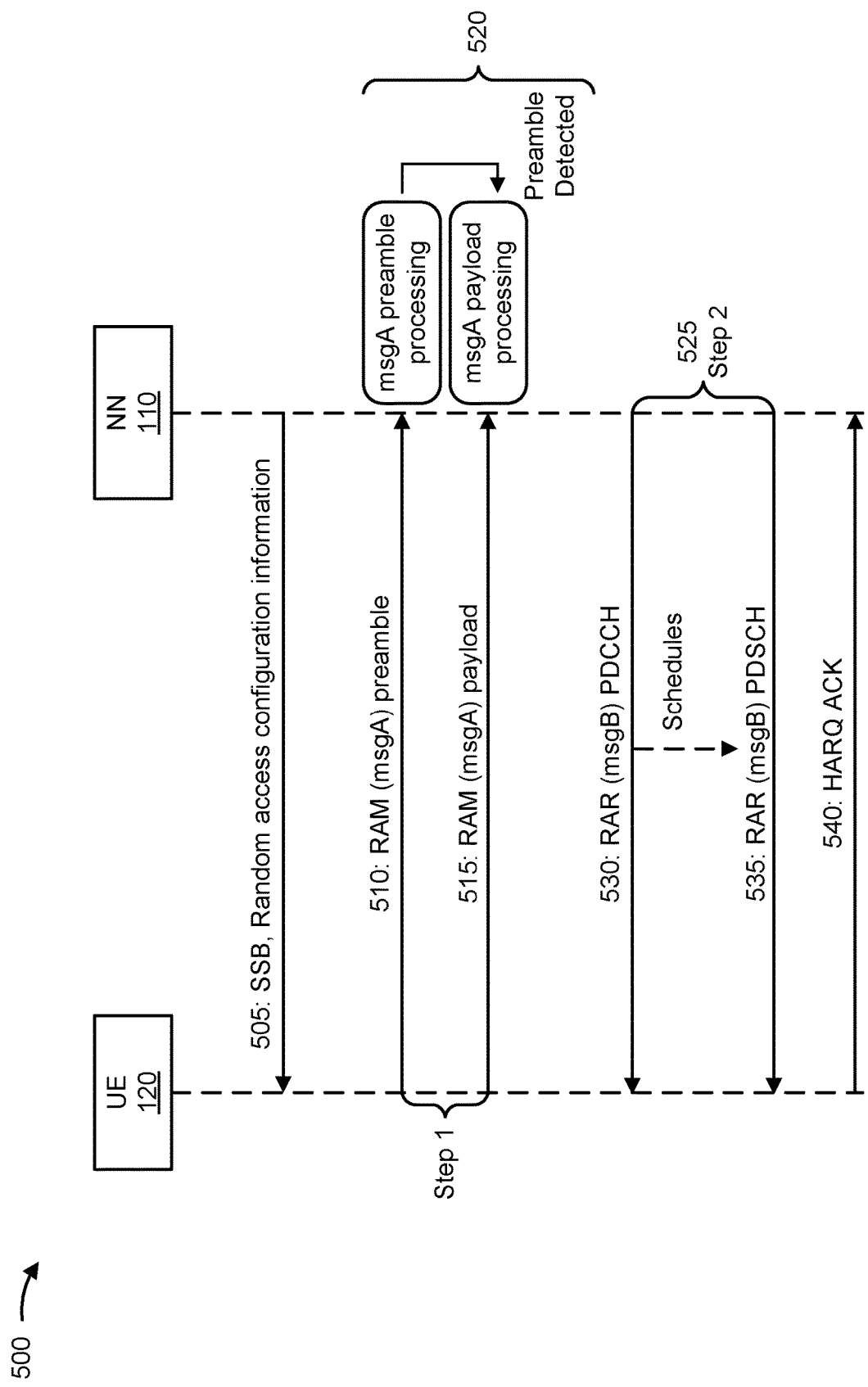
FIG. 5 is a diagram illustrating an example of a two-step RACH procedure, in accordance with the present disclosure.

FIG. 5 is a diagram illustrating an example 500 of a two-step RACH procedure, in accordance with the present disclosure. As shown in FIG. 5, a network entity (e.g., network node 110) and a UE 120 may communicate with one another to perform the two-step RACH procedure.

As shown by reference number 505, the network node 110 may transmit, and the UE 120 may receive, one or more SSBs and random access configuration information. In some aspects, the random access configuration information may be transmitted in and/or indicated by system information (e.g., in one or more SIBs) and/or an SSB, such as for CBRA. Additionally, or alternatively, the random access configuration information may be transmitted in an RRC message and/or a PDCCH order message that triggers a RACH procedure, such as for CFRA. The random access configuration information may include one or more parameters to be used in the two-step RACH procedure, such as one or more parameters for transmitting a RAM and/or receiving a RAR to the RAM.

As shown by reference number 510, the UE 120 may transmit, and the network node 110 may receive, a RAM preamble. As shown by reference number 515, the UE 120 may transmit, and the network node 110 may receive, a RAM payload. As shown, the UE 120 may transmit the RAM preamble and the RAM payload to the network node 110 as part of an initial (or first) step of the two-step RACH procedure. In some aspects, the RAM may be referred to as message A, msgA, a first message, or an initial message in a two-step RACH procedure. Furthermore, in some aspects, the RAM preamble may be referred to as a message A preamble, a msgA preamble, a preamble, or a PRACH preamble, and the RAM payload may be referred to as a message A payload, a msgA payload, or a payload. In some aspects, the RAM may include some or all of the contents of message 1 (msg1) and message 3 (msg3) of a four-step RACH procedure, which is described in more detail below. For example, the RAM preamble may include some or all contents of message 1 (e.g., a PRACH preamble), and the RAM payload may include some or all contents of message 3 (e.g., a UE identifier, UCI, and/or a PUSCH transmission). That is, a msgA may include a msg1 and a PUSCH communication.

As shown by reference number 520, the network node 110 may receive the RAM preamble transmitted by the UE 120. If the network node 110 successfully receives and decodes the RAM preamble, the network node 110 may then receive and decode the RAM payload.

As shown by reference number 525, the network node 110 may transmit an RAR (sometimes referred to as an RAR message). As shown, the network node 110 may transmit the RAR message as part of a second step of the two-step RACH procedure. In some aspects, the RAR message may be referred to as message B, msgB, or a second message in a two-step RACH procedure. The RAR message may include some or all of the contents of message 2 (msg2) and message 4 (msg4) of a four-step RACH procedure. For example, the RAR message may include the detected PRACH preamble identifier, the detected UE identifier, a timing advance value, and/or contention resolution information.

As shown by reference number 530, as part of the second step of the two-step RACH procedure, the network node 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 535, as part of the second step of the two-step random access procedure, the network node 110 may transmit the PDSCH communication for the RAR, as scheduled by the PDCCH communication. The RAR may be included in a MAC PDU of the PDSCH communication. As shown by reference number 540, if the UE 120 successfully receives the RAR, the UE 120 may transmit a HARQ ACK.

Four-step and two-step RACH procedures may be defined for idle or inactive RedCap UEs, which are UEs with reduced capabilities as compared to UEs that have full capabilities. The network may configure dedicated RACH occasions (ROs) or dedicated PRACH preambles for Red- Cap UEs. An idle or inactive RedCap UE may receive an early identification message in a msg1 or msgA, if RedCap-specific RACH resources are configured. The network may also provide an early identification in msg3 or msgA PUSCH. Two new logical channel identifiers (LCIDs) for common control channel (CCCH)/1 may be used for RedCap UEs, for early identification via msg3 or msgA PUSCH. Whenever a UE sends CCCH/1 data in msg3 or msgA PUSCH, the UE may use a RedCap-specific LCID, regardless of whether msg1/A early identification is used (to simplify UE implementation).

As indicated above, FIG. 5 is provided as an example. Other examples may differ from what is described with regard to FIG. 5.

Figure 6:
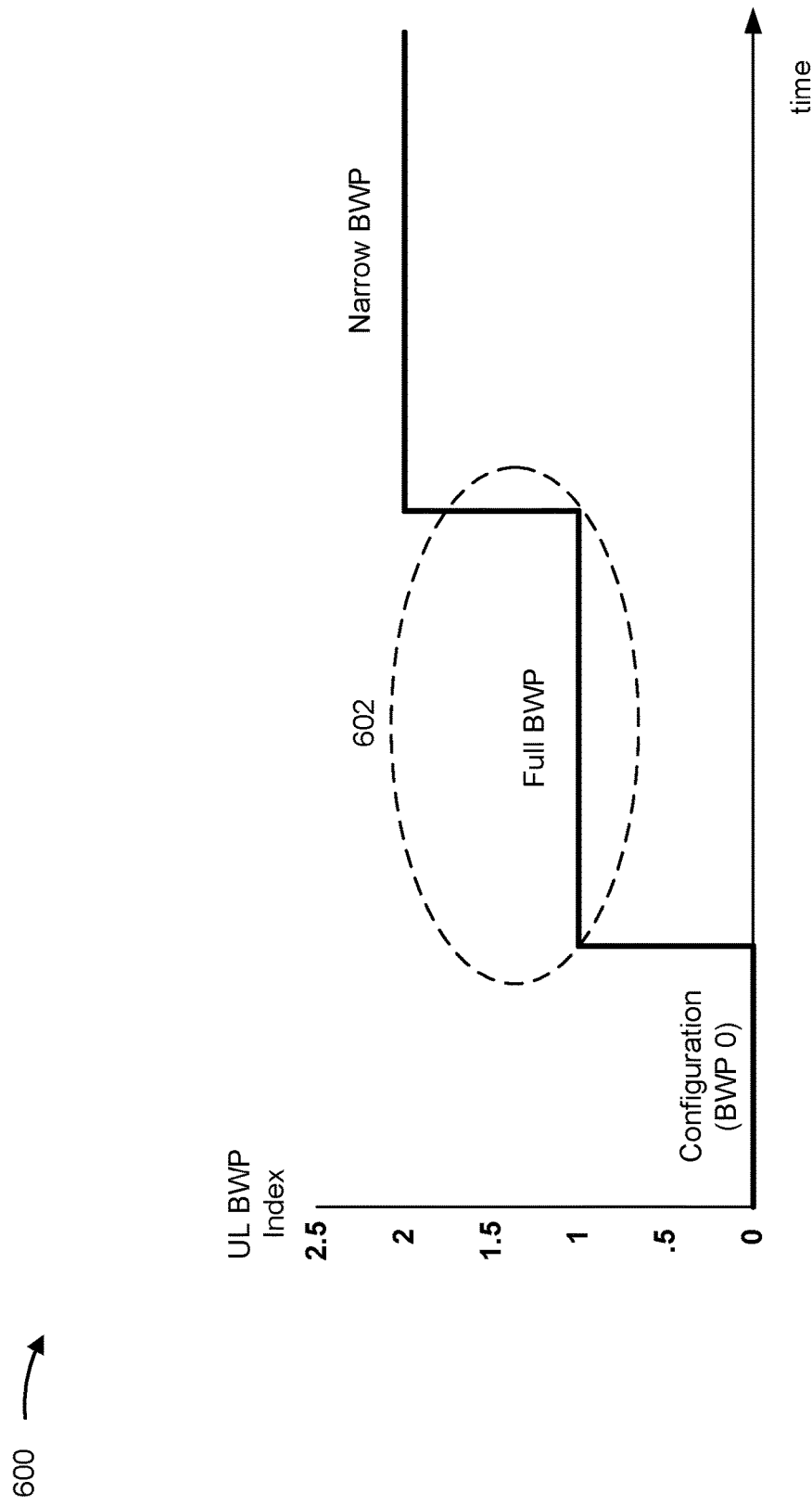
FIG. 6 is a diagram illustrating an example of bandwidth parts (BWPs), in accordance with the present disclosure.

FIG. 6 is a diagram illustrating an example 600 of BWPs, in accordance with the present disclosure.

A UE may use a BWP for communications rather than a full bandwidth, in order to conserve energy and signaling resources. The UE may switch between multiple BWPs (e.g., 4 BWPs) that are all smaller in size (frequency range or bandwidth) than a full bandwidth or a full available BWP. The full BWP may include all BWPs that can be activated.

During a call setup or a handover, a network may configure a UE with a narrow BWP and a full BWP that can be used for communications. The narrow BWP is smaller in frequency bandwidth than the full BWP. However, as shown by reference number 602, the network configures the full BWP, rather than a narrow BWP, as the initial active BWP that is used when the UE is first active. Only after a few seconds does the UE switch from the full BWP to the narrow BWP, based on traffic. Using the full BWP as the initial active BWP, with a larger frequency bandwidth than the narrow BWP, consumes power. In some scenarios, the UE may provide or receive assistance information (e.g., UE assistance information (UAI)) associated with BWP usage, but that assistance information is usually provided too late to use to conserve power.

As indicated above, FIG. 6 is provided as an example. Other examples may differ from what is described with regard to FIG. 6.

Figure 7:
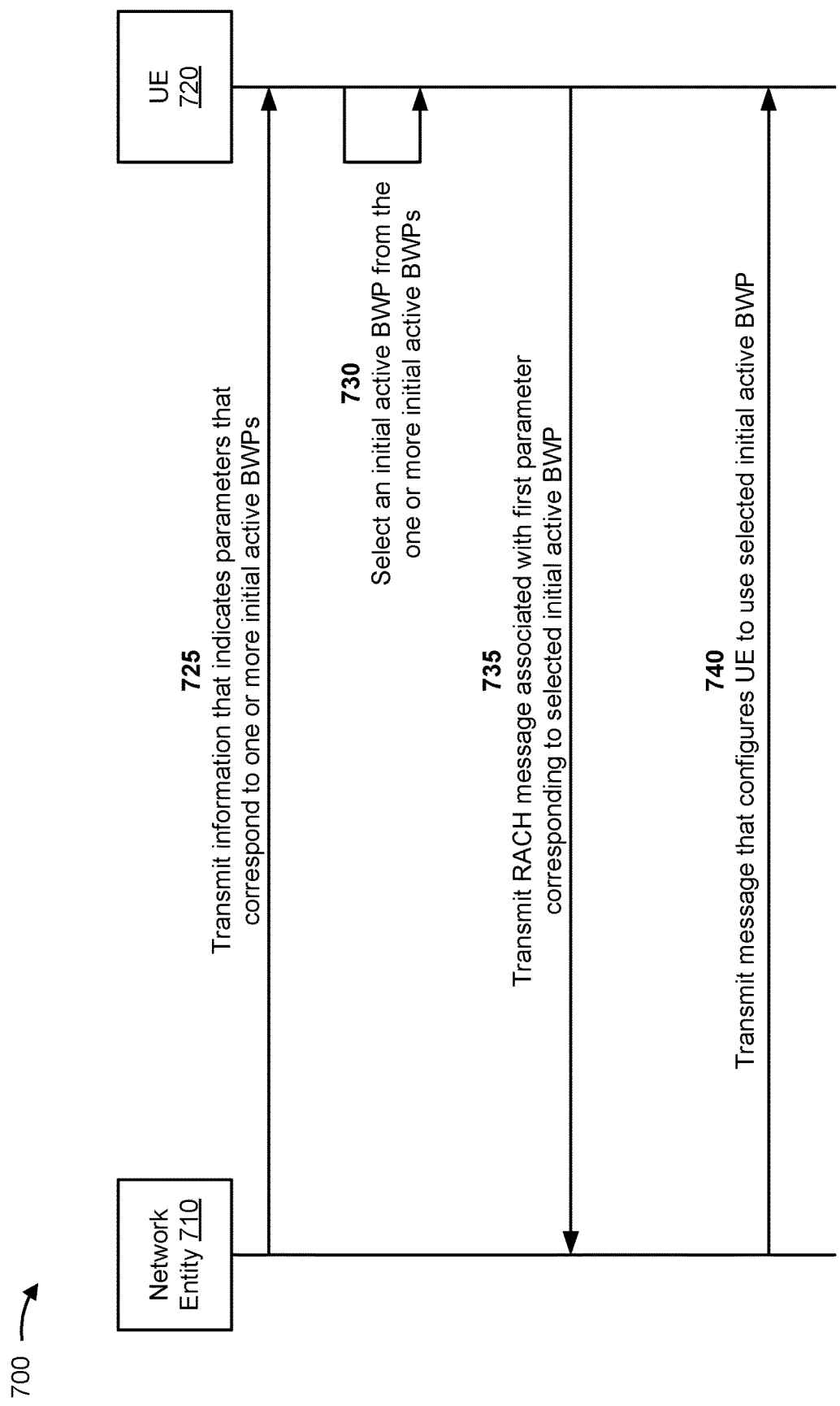
FIG. 7 is a diagram illustrating an example associated with indicating parameters for an initial active BWP, in accordance with the present disclosure.

FIG. 7 is a diagram illustrating an example 700 associated with indicating parameters for an initial active BWP, in accordance with the present disclosure. As shown in FIG. 7, a network entity 710 (e.g., network node 110) and a UE 720 (e.g., UE 120) may communicate with one another via a wireless network (e.g., wireless network 100).

According to various aspects described herein, the network entity 710 may provide an early identification of one or more initial active BWPs that the UE may use first upon activation. Each initial active BWP may be less than a full BWP. In some aspects, the network entity 710 may indicate an initial active BWP during initial access for a call setup, a call resume, or a call handover before a RACH msg5. For example, the network entity 710 may provide information about the initial active BWP in a RACH msg1. The network entity 710 may provide the information in a RACH msg3 or a PUSCH part of a RACH msgA.

Example 700 shows an early identification of one or more initial active BWPs. As shown by reference number 725, the network entity 710 may transmit information that indicates parameters that correspond to the one or more initial active BWPs. The information may be received in a broadcast message during an idle mode of the UE 720. The information may be received in a handover command. The information may be received in another message that is transmitted as part of an initial access or before a RACH procedure is complete.

As shown by reference number 730, the UE 720 may select an initial active BWP from the one or more initial active BWPs. The selection may be based at least in part on an amount of data, traffic conditions, channel conditions, and/or an energy status (e.g., battery level, battery consumption, energy harvesting) of the UE 720. As shown by reference number 735, the UE 720 may transmit a RACH message associated with a first parameter indicated in the information that corresponds to the selected initial active BWP.

As shown by reference number 740, the network entity 710 may transmit a message that configures the UE 720 to use the selected initial active BWP. The UE 720 may communicate in the initial active BWP that is smaller than the full BWP. In some aspects, communicating in the initial active BWP includes transmitting a communication in an initial active uplink BWP or receiving a communication in an initial active downlink BWP. In some aspects, communicating in the initial active BWP includes communicating in the initial active BWP after receiving a msg4 RACH message that configures the UE to use the initial active BWP.

By using an early indication of an initial active BWP during a RACH procedure, the UE 720 may use an initial active BWP that is smaller than a full available BWP. As a result, the UE 720 conserves energy that would otherwise be consumed by using a larger frequency bandwidth.

In some aspects, the network entity 710 may indicate a larger BWP for higher throughput when a narrowband BWP would not be sufficient. The early indication provides flexibility to increase throughput or to conserve power when the UE 720 is activated. The early indication may be provided sooner than UAI, to reduce latency and conserve power.

In some aspects, the first parameter may include a preamble index. The RACH message may include a preamble that is associated with the preamble index. The network entity 710 may determine the initial active BWP based at least in part on in which preamble index range the preamble index belongs and/or a preamble type associated with the preamble index. In some aspects, the UE 720 may transmit the RACH message further based at least in part on a second parameter. The second parameter may indicate an RO. The UE 720 may transmit the preamble in the RO. Alternatively, in some aspects, the first parameter indicates the RO, and the UE 720 may transmit the RACH message in the RO. By using a preamble or an RO to indicate a selected initial active BWP, the UE 720 may conserve signaling resources by using existing signaling techniques.

In some aspects, as part of an early identification in msg1 or msgA, the network entity 710 may configure dedicated ROs or dedicated PRACH preambles for a preferred initial active BWP. If preferred initial active BWP-specific RACH resources are configured, the UE 720 may use only such resources when transmitting a msg1 or a msgA.

In some aspects, the first parameter may include an LCID. The RACH message may include a msg3 RACH message that indicates the LCID. The RACH message may include a msgA RACH message that indicates the LCID in a PUSCH portion of the msgA RACH message. The network entity 710 may select the initial active BWP based at least in part on the LCID that is indicated in the RACH message.

In some aspects, the UE 720 may use two new LCIDs for CCCH/1 or a MAC control element (MAC CE) for a preferred initial active BWP, for early identification via msg3 or msgA PUSCH. Whenever the UE 720 transmits CCCH/1 data in a msg3 or msgA PUSCH, the UE 720 may use a preferred initial active BWP LCID, regardless of whether msg1 or msgA early identification is used or not (to simplify UE implementation). By using an LCID to indicate a selected initial active BWP, the UE 720 may conserve signaling resources by using existing signaling techniques.

As indicated above, FIG. 7 is provided as an example. Other examples may differ from what is described with regard to FIG. 7.

FIG. 8 is a diagram illustrating an example 800 of other parameters that can be provided as part of a RACH procedure, in accordance with the present disclosure.

Example 800 shows a data structure (e.g., table) of parameters that may be used for a RACH procedure. The UE 720 may reference the table, which may indicate a first parameter, such as a preamble index/RO range/LCID/MAC CE that maps to each initial active BWP. The table may include other (second) parameters that the UE 720 may indicate, such as a preferred uplink (UL)/downlink (DL) MIMO layer. The table may include connected mode discontinuous reception (C-DRX settings) (e.g., on duration length, DRX cycle length, offset, inactivity timer). The table may include a setting for how sparse the PDCCH monitoring is expected to be, such as a periodicity (P1) of monitoring occasions and an offset (P2) of monitoring occasions. For example, the periodicity may be every occasion (1/1) up to every one out of eight occasions (⅛). The table may include information regarding how many msg3 or msgB repetitions are to be used in a RACH procedure.

As indicated above, FIG. 8 is provided as an example. Other examples may differ from what is described with respect to FIG. 8.

Figure 9:
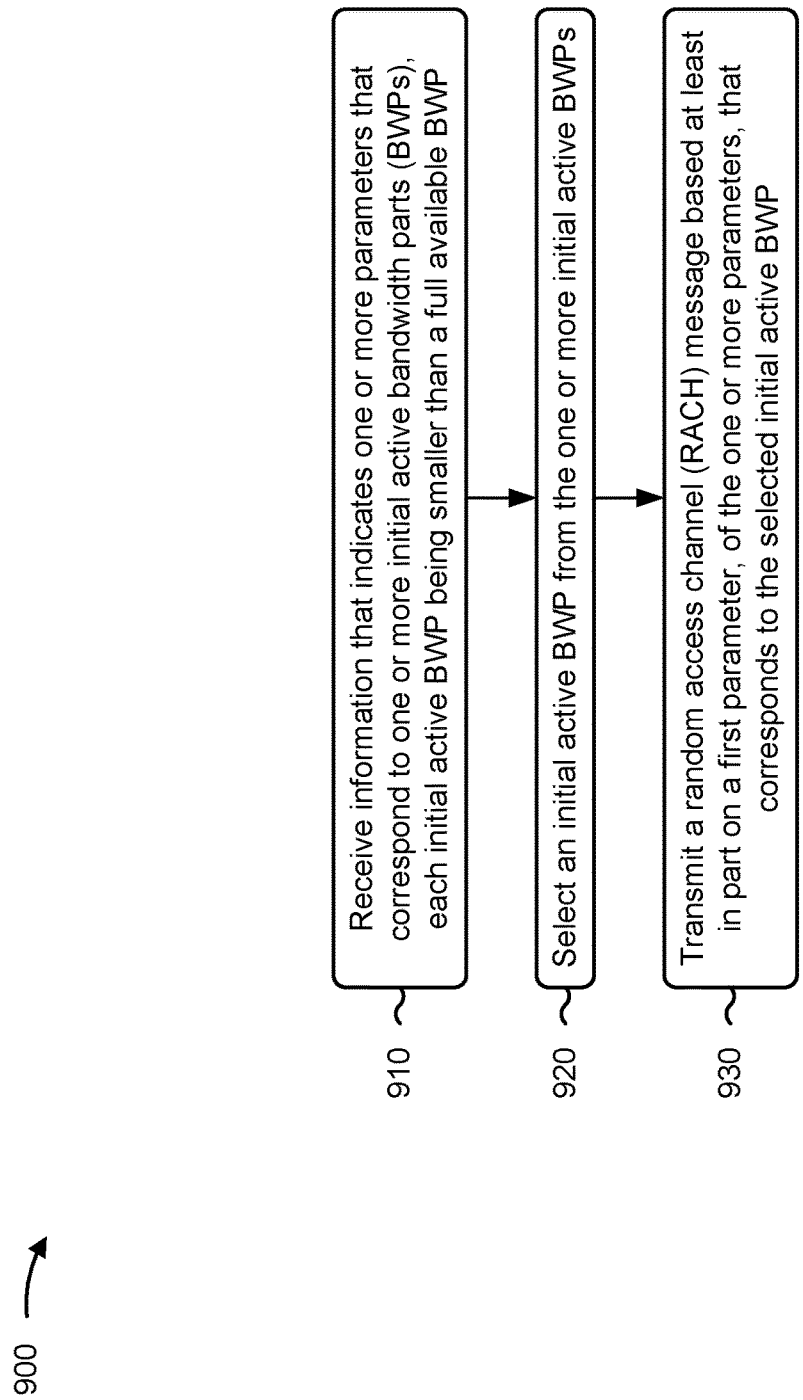
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120, UE 720) performs operations associated with receiving an indication of an initial active BWP.

As shown in FIG. 9, in some aspects, process 900 may include receiving information that indicates one or more parameters that correspond to one or more initial active BWPs, each initial active BWP being smaller than a full available BWP (block 910). For example, the UE (e.g., using reception component 1102 and/or communication manager 1106, depicted in FIG. 11) may receive information that indicates one or more parameters that correspond to one or more initial active BWPs, each initial active BWP being smaller than a full available BWP, as described above.

As further shown in FIG. 9, in some aspects, process 900 may include selecting an initial active BWP from the one or more initial active BWPs (block 920). For example, the UE (e.g., using communication manager 1106, depicted in FIG. 11) may select an initial active BWP from the one or more initial active BWPs, as described above.

As further shown in FIG. 9, in some aspects, process 900 may include transmitting a RACH message based at least in part on a first parameter, of the one or more parameters, that corresponds to the selected initial active BWP (block 930). For example, the UE (e.g., using transmission component 1104 and/or communication manager 1106, depicted in FIG. 11) may transmit a RACH message based at least in part on a first parameter, of the one or more parameters, that corresponds to the selected initial active BWP, as described above.

Process 900 may include additional aspects, such as any single aspect or any combination of aspects described below and/or in connection with one or more other processes described elsewhere herein.

In a first aspect, the first parameter includes a preamble index, and transmitting the RACH message includes transmitting a preamble that is associated with the preamble index.

In a second aspect, alone or in combination with the first aspect, transmitting the RACH message includes transmitting the RACH message further based at least in part on a second parameter, where the second parameter indicates an RO, and transmitting the preamble includes transmitting the preamble in the RO.

In a third aspect, alone or in combination with one or more of the first and second aspects, the first parameter indicates an RO, and transmitting the RACH message includes transmitting the RACH message in the RO.

In a fourth aspect, alone or in combination with one or more of the first through third aspects, the first parameter includes an LCID.

In a fifth aspect, alone or in combination with one or more of the first through fourth aspects, the RACH message includes a msg3 RACH message that indicates the LCID.

In a sixth aspect, alone or in combination with one or more of the first through fifth aspects, the RACH message includes a msgA RACH message that indicates the LCID in a PUSCH portion of the msgA RACH message.

In a seventh aspect, alone or in combination with one or more of the first through sixth aspects, the RACH message indicates a second parameter.

In an eighth aspect, alone or in combination with one or more of the first through seventh aspects, the second parameter indicates a quantity of msg3 repetitions or a quantity of msgB repetitions.

In a ninth aspect, alone or in combination with one or more of the first through eighth aspects, the second parameter indicates a set of MIMO layers.

In a tenth aspect, alone or in combination with one or more of the first through ninth aspects, the second parameter indicates one or more of a periodicity of monitoring occasions or an offset of monitoring occasions.

In an eleventh aspect, alone or in combination with one or more of the first through tenth aspects, the second parameter indicates a DRX setting.

In a twelfth aspect, alone or in combination with one or more of the first through eleventh aspects, receiving the information includes receiving the information in a broadcast message during an idle mode of the UE.

In a thirteenth aspect, alone or in combination with one or more of the first through twelfth aspects, receiving the information includes receiving the information in a handover command.

In a fourteenth aspect, alone or in combination with one or more of the first through thirteenth aspects, process 900 includes communicating in the initial active BWP.

In a fifteenth aspect, alone or in combination with one or more of the first through fourteenth aspects, communicating in the initial active BWP includes transmitting a communication in an initial active uplink BWP or receiving a communication in an initial active downlink BWP.

In a sixteenth aspect, alone or in combination with one or more of the first through fifteenth aspects, communicating in the initial active BWP includes communicating in the initial active BWP after receiving a msg4 RACH message that configures the UE to use the initial active BWP.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
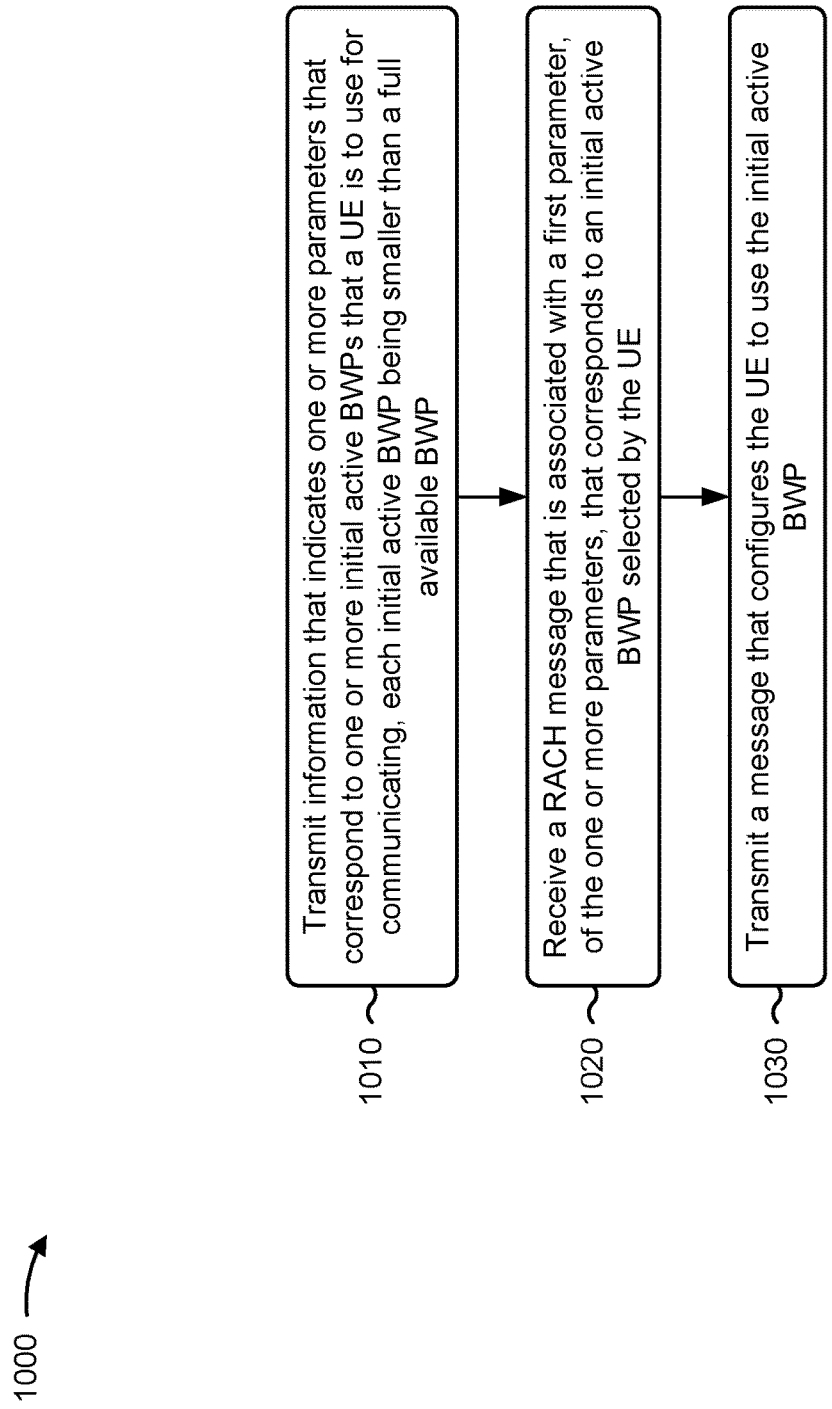
FIG. 10 is a diagram illustrating an example process performed, for example, by a network entity, in accordance with the present disclosure.

FIG. 10 is a diagram illustrating an example process 1000 performed, for example, by a network entity, in accordance with the present disclosure. Example process 1000 is an example where the network entity (e.g., network node 110, network entity 710) performs operations associated with indicating an initial active BWP.

As shown in FIG. 10, in some aspects, process 1000 may include transmitting information that indicates one or more parameters that correspond to one or more initial active BWPs that a UE is to use for communicating, each initial active BWP being smaller than a full available BWP (block 1010). For example, the network entity (e.g., using transmission component 1204 and/or communication manager 1206, depicted in FIG. 12) may transmit information that indicates one or more parameters that correspond to one or more initial active BWPs that a UE is to use for communicating, each initial active BWP being smaller than a full available BWP, as described above.

As further shown in FIG. 10, in some aspects, process 1000 may include receiving a RACH message that is associated with a first parameter, of the one or more parameters, that corresponds to an initial active BWP selected by the UE (block 1020). For example, the network entity (e.g., using reception component 1202 and/or communication manager 1206, depicted in FIG. 12) may receive a RACH message that is associated with a first parameter, of the one or more parameters, that corresponds to an initial active BWP selected by the UE, as described above.

As further shown in FIG. 10, in some aspects, process 1000 may include transmitting a message that configures the UE to use the initial active BWP (block 1030). For example, the network entity (e.g., using transmission component 1204 and/or communication manager 1206, depicted in FIG. 12) may transmit a message that configures the UE to use the initial active BWP, as described above.

Process 1000 may include additional aspects, such as any single aspect or any combination of aspects described below and/or in connection with one or more other processes described elsewhere herein.

In a first aspect, the first parameter includes a preamble index, and receiving the RACH message includes receiving a preamble that is associated with the preamble index.

In a second aspect, alone or in combination with the first aspect, receiving the RACH message includes receiving the RACH message associated with a second parameter, where the second parameter indicates an RO, and receiving the preamble includes receiving the preamble in the RO.

In a third aspect, alone or in combination with one or more of the first and second aspects, the first parameter indicates an RO, and receiving the RACH message includes receiving the RACH message in the RO.

In a fourth aspect, alone or in combination with one or more of the first through third aspects, the first parameter includes an LCID.

In a fifth aspect, alone or in combination with one or more of the first through fourth aspects, the RACH message includes a msg3 RACH message that indicates the LCID.

In a sixth aspect, alone or in combination with one or more of the first through fifth aspects, the RACH message includes a msgA RACH message that indicates the LCID in a PUSCH portion of the msgA RACH message.

In a seventh aspect, alone or in combination with one or more of the first through sixth aspects, the RACH message indicates a second parameter that indicates one or more of a quantity of msg3 repetitions, a quantity of msgB repetitions, a set of MIMO layers, a periodicity of monitoring occasions, an offset of monitoring occasions, or a DRX setting.

In an eighth aspect, alone or in combination with one or more of the first through seventh aspects, transmitting the information includes transmitting the information in a broadcast message or in a handover command.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
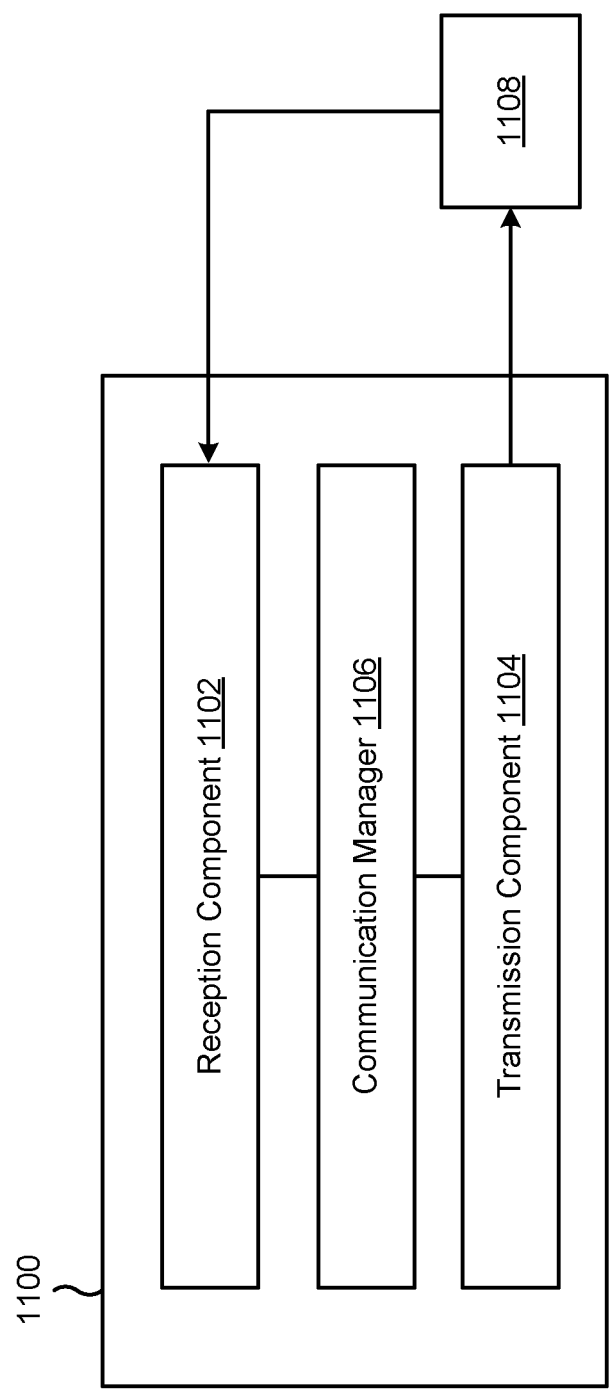
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE (e.g., UE 120, UE 720), or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 1-10. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive information that indicates one or more parameters that correspond to one or more initial active BWPs, each initial active BWP being smaller than a full available BWP. The communication manager 1106 may select an initial active BWP from the one or more initial active BWPs. The transmission component 1104 may transmit a RACH message based at least in part on a first parameter, of the one or more parameters, that corresponds to the selected initial active BWP. The communication manager 1106, the reception component 1102, and/or the transmission component 1104 may communicate in the initial active BWP.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
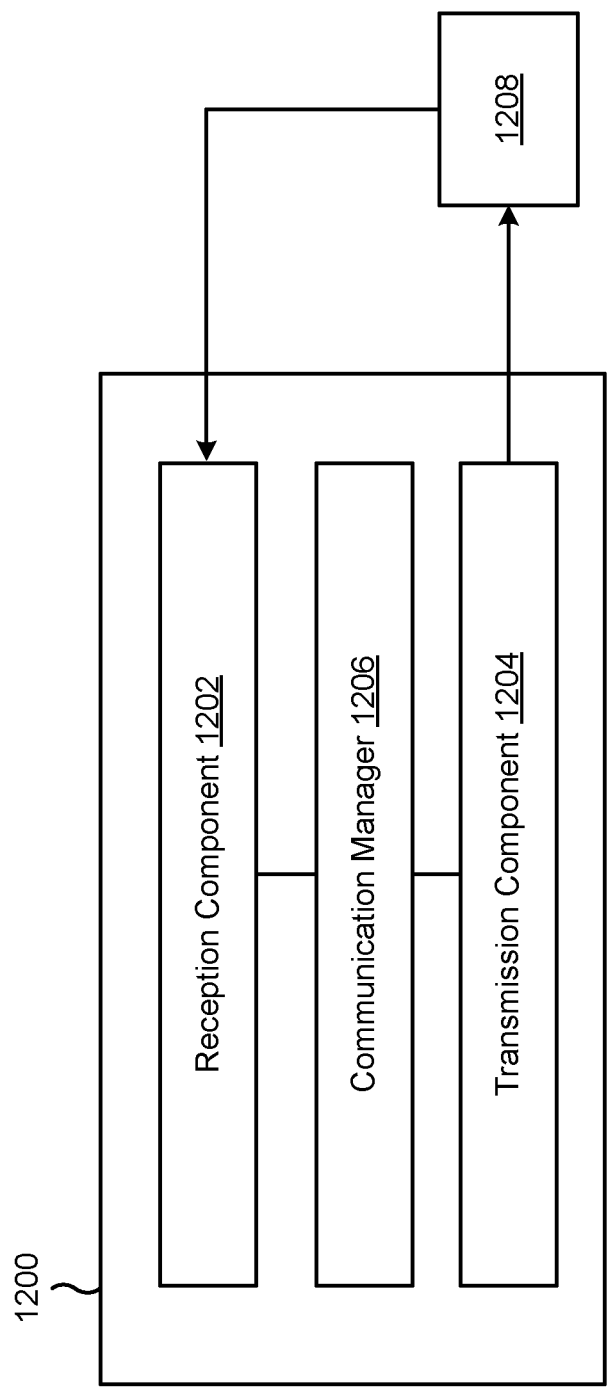
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network entity (e.g., network node 110, network entity 710), or a network entity may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 1-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network entity described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network entity described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network entity described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit information that indicates one or more parameters that correspond to one or more initial active BWPs that a UE is to use for communicating, each initial active BWP being smaller than a full available BWP. The reception component 1202 may receive a RACH message that is associated with a first parameter, of the one or more parameters, that corresponds to an initial active BWP selected by the UE. The transmission component 1204 may transmit a message that configures the UE to use the initial active BWP.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving information that indicates one or more parameters that correspond to one or more initial active bandwidth parts (BWPs), each initial active BWP being smaller than a full available BWP; selecting an initial active BWP from the one or more initial active BWPs; and transmitting a random access channel (RACH) message based at least in part on a first parameter, of the one or more parameters, that corresponds to the selected initial active BWP.

Aspect 2: The method of Aspect 1, wherein the first parameter includes a preamble index, and wherein transmitting the RACH message includes transmitting a preamble that is associated with the preamble index.

Aspect 3: The method of Aspect 2, wherein transmitting the RACH message includes transmitting the RACH message further based at least in part on a second parameter, wherein the second parameter indicates a RACH occasion (RO), and wherein transmitting the preamble includes transmitting the preamble in the RO.

Aspect 4: The method of Aspect 1, wherein the first parameter indicates a RACH occasion (RO), and wherein transmitting the RACH message includes transmitting the RACH message in the RO.

Aspect 5: The method of any of Aspects 1-4, wherein the first parameter includes a logical channel identifier (LCID).

Aspect 6: The method of Aspect 5, wherein the RACH message includes a msg3 RACH message that indicates the LCID.

Aspect 7: The method of Aspect 5, wherein the RACH message includes a msgA RACH message that indicates the LCID in a physical uplink shared channel portion of the msgA RACH message.

Aspect 8: The method of any of Aspects 1-7, wherein the RACH message indicates a second parameter.

Aspect 9: The method of Aspect 8, wherein the second parameter indicates a quantity of msg3 repetitions or a quantity of msgB repetitions.

Aspect 10: The method of Aspect 8, wherein the second parameter indicates a set of multiple-input multiple-output layers.

Aspect 11: The method of Aspect 8, wherein the second parameter indicates one or more of a periodicity of monitoring occasions or an offset of monitoring occasions.

Aspect 12: The method of Aspect 8, wherein the second parameter indicates a discontinuous reception setting.

Aspect 13: The method of any of Aspects 1-12, wherein receiving the information includes receiving the information in a broadcast message during an idle mode of the UE.

Aspect 14: The method of any of Aspects 1-13, wherein receiving the information includes receiving the information in a handover command.

Aspect 15: The method of any of Aspects 1-14, further comprising communicating in the initial active BWP.

Aspect 16: The method of Aspect 15, wherein communicating in the initial active BWP includes transmitting a communication in an initial active uplink BWP or receiving a communication in an initial active downlink BWP.

Aspect 17: The method of any of Aspects 1-16, wherein communicating in the initial active BWP includes communicating in the initial active BWP after receiving a msg4 RACH message that configures the UE to use the initial active BWP.

Aspect 18: A method of wireless communication performed by a network entity, comprising: transmitting information that indicates one or more parameters that correspond to one or more initial active bandwidth parts (BWPs) that a user equipment (UE) is to use for communicating, each initial active BWP being smaller than a full available BWP; receiving a random access channel (RACH) message that is associated with a first parameter, of the one or more parameters, that corresponds to an initial active BWP selected by the UE; and transmitting a message that configures the UE to use the initial active BWP.

Aspect 19: The method of Aspect 18, wherein the first parameter includes a preamble index, and wherein receiving the RACH message includes receiving a preamble that is associated with the preamble index.

Aspect 20: The method of Aspect 19, wherein receiving the RACH message includes receiving the RACH message associated with a second parameter, wherein the second parameter indicates a RACH occasion (RO), and wherein receiving the preamble includes receiving the preamble in the RO.

Aspect 21: The method of Aspect 18, wherein the first parameter indicates a RACH occasion (RO), and wherein receiving the RACH message includes receiving the RACH message in the RO.

Aspect 22: The method of any of Aspects 18-21, wherein the first parameter includes a logical channel identifier (LCID).

Aspect 23: The method of Aspect 22, wherein the RACH message includes a msg3 RACH message that indicates the LCID.

Aspect 24: The method of Aspect 22, wherein the RACH message includes a msgA RACH message that indicates the LCID in a physical uplink shared channel portion of the msgA RACH message.

Aspect 25: The method of any of Aspects 18-24, wherein the RACH message indicates a second parameter that indicates one or more of a quantity of msg3 repetitions, a quantity of msgB repetitions, a set of multiple-input multiple-output layers, a periodicity of monitoring occasions, an offset of monitoring occasions, or a discontinuous reception setting.

Aspect 26: The method of any of Aspects 18-25, wherein transmitting the information includes transmitting the information in a broadcast message or in a handover command.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive information that indicates one or more parameters that correspond to one or more initial active bandwidth parts (BWPs), each initial active BWP being smaller than a full available BWP;
      select an initial active BWP from the one or more initial active BWPs; and
      transmit a random access channel (RACH) message based at least in part on a first parameter, of the one or more parameters, that corresponds to the selected initial active BWP, wherein at least one of:
         the first parameter includes a logical channel identifier (LCID), or
         the RACH message indicates a second parameter that indicates at least one of:
            a quantity of msg3 repetitions,
            a quantity of msgB repetitions,
            a set of multiple-input multiple-output layers,
            a periodicity of monitoring occasions,
            an offset of monitoring occasions, or
            a discontinuous reception setting.

2. The UE of claim 1,
   wherein the first parameter includes a preamble index, and
   wherein transmitting the RACH message includes transmitting a preamble that is associated with the preamble index.

3. The UE of claim 1,
   wherein the first parameter indicates a RACH occasion (RO), and wherein the one or more processors, to transmit the RACH message, are configured to transmit the RACH message in the RO.

4. The UE of claim 1,
   wherein the first parameter includes the LCID.

5. The UE of claim 4,
   wherein the RACH message includes a msg3 RACH message that indicates the LCID.

31

6. The UE of claim 4, wherein the RACH message includes a msgA RACH message that indicates the LCID in a physical uplink shared channel portion of the msgA RACH message.

7. The UE of claim 1, wherein the RACH message indicates the second parameter.

8. The UE of claim 7, wherein the second parameter indicates one or more of the quantity of msg3 repetitions or the quantity of msgB repetitions.

9. The UE of claim 7, wherein the second parameter indicates the set of multiple-input multiple-output layers.

10. The UE of claim 7, wherein the second parameter indicates one or more of the periodicity of monitoring occasions or the offset of monitoring occasions.

11. The UE of claim 7, wherein the second parameter indicates the discontinuous reception setting.

12. The UE of claim 1, wherein the one or more processors, to receive the information, are configured to receive the information in a broadcast message during an idle mode of the UE.

13. The UE of claim 1, wherein the one or more processors, to receive the information, are configured to receive the information in a handover command.

14. The UE of claim 1, wherein the one or more processors are configured to communicate in the initial active BWP.

15. The UE of claim 14, wherein the one or more processors, to communicate in the initial active BWP, are configured to transmit or receive a communication in an initial active uplink BWP.

16. The UE of claim 1, wherein the one or more processors, to communicate in the initial active BWP, are configured to communicate in the initial active BWP after receiving a msg4 RACH message that configures the UE to use the initial active BWP.

17. A network entity for wireless communication, comprising:
one or more memories; and
one or more processors, coupled to the one or more memories, configured to:
transmit information that indicates one or more parameters that correspond to one or more initial active bandwidth parts (BWPs) that a user equipment (UE) is to use for communicating, each initial active BWP being smaller than a full available BWP;
receive a random access channel (RACH) message that is associated with a first parameter, of the one or more parameters, that corresponds to an initial active BWP selected by the UE; and
transmit a message that configures the UE to use the initial active BWP, wherein at least one of:
the first parameter includes a logical channel identifier (LCID), or
the RACH message indicates a second parameter that indicates at least one of:
a quantity of msg3 repetitions,
a quantity of msgB repetitions,
a set of multiple-input multiple-output layers,
a periodicity of monitoring occasions,

32 an offset of monitoring occasions, or
a discontinuous reception setting.

18. The network entity of claim 17, wherein the first parameter includes a preamble index, and wherein the one or more processors, to receive the RACH message, are configured to receive a preamble that is associated with the preamble index.

19. The network entity of claim 17, wherein the first parameter indicates a RACH occasion (RO), and wherein the one or more processors, to receive the RACH message, are configured to receive the RACH message in the RO.

20. The network entity of claim 17, wherein the first parameter includes the LCID.

21. The network entity of claim 20, wherein the RACH message includes a msg3 RACH message that indicates the LCID.

22. The network entity of claim 20, wherein the RACH message includes a msgA RACH message that indicates the LCID in a physical uplink shared channel portion of the msgA RACH message.

23. The network entity of claim 17, wherein the RACH message indicates the second parameter, wherein the second parameter indicates one or more of the quantity of msg3 repetitions, the quantity of msgB repetitions, the set of multiple-input multiple-output layers, the periodicity of monitoring occasions, the offset of monitoring occasions, or the discontinuous reception setting.

24. The network entity of claim 17, wherein the one or more processors, to transmit the information, are configured to transmit the information in a broadcast message or in a handover command.

25. The network entity of claim 17, wherein the RACH message indicates the second parameter, wherein the second parameter indicates one or more of the quantity of msg3 repetitions, the quantity of msgB repetitions, the set of multiple-input multiple-output layers, the periodicity of monitoring occasions, the offset of monitoring occasions, or the discontinuous reception setting.

26. A method of wireless communication performed by a user equipment (UE), comprising:
receiving information that indicates one or more parameters that correspond to one or more initial active bandwidth parts (BWPs), each initial active BWP being smaller than a full available BWP;
selecting an initial active BWP from the one or more initial active BWPs; and
transmitting a random access channel (RACH) message based at least in part on a first parameter, of the one or more parameters, that corresponds to the selected initial active BWP, wherein at least one of:
the first parameter includes a logical channel identifier (LCID), or
the RACH message indicates a second parameter that indicates at least one of:
a quantity of msg3 repetitions,
a quantity of msgB repetitions,
a set of multiple-input multiple-output layers,
a periodicity of monitoring occasions,
an offset of monitoring occasions, or
a discontinuous reception setting.

27. The method of claim 26, wherein the first parameter includes the logical channel identifier.

28. The method of claim 26, wherein the first parameter includes the LCID.

29. A method of wireless communication performed by a network entity, comprising:
- transmitting information that indicates one or more parameters that correspond to one or more initial active bandwidth parts (BWPs) that a user equipment (UE) is to use for communicating, each initial active BWP being smaller than a full available BWP;
- receiving a random access channel (RACH) message that is associated with a first parameter, of the one or more parameters, that corresponds to an initial active BWP selected by the UE; and
- transmitting a message that configures the UE to use the initial active BWP, wherein at least one of:
  - the first parameter includes a logical channel identifier (LCID), or
  - the RACH message indicates a second parameter that indicates at least one of:
    - a quantity of msg3 repetitions,
    - a quantity of msgB repetitions,
    - a set of multiple-input multiple-output layers,
    - a periodicity of monitoring occasions,
    - an offset of monitoring occasions, or
    - a discontinuous reception setting.

30. The method of claim 29, wherein the first parameter includes the LCID.

\* \* \* \* \*